(12) United States Patent
Yamada

(10) Patent No.: US 9,197,077 B2
(45) Date of Patent: Nov. 24, 2015

(54) CHARGING CONTROL OF A BATTERY PACK OF AN ELECTRONIC APPARATUS

(71) Applicant: FUJITSU LIMITED, Kawasaki-shi, Kanagawa (JP)

(72) Inventor: Shigeru Yamada, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 13/936,977

(22) Filed: Jul. 8, 2013

(65) Prior Publication Data

US 2014/0042984 A1 Feb. 13, 2014

(30) Foreign Application Priority Data

Aug. 8, 2012 (JP) ................. 2012-176515

(51) Int. Cl.
*H02J 7/00* (2006.01)
*H02J 5/00* (2006.01)
*H02J 7/02* (2006.01)

(52) U.S. Cl.
CPC .............. *H02J 7/0013* (2013.01); *H02J 7/0054* (2013.01); *H02J 7/0055* (2013.01); *H02J 7/025* (2013.01); *H02J 5/005* (2013.01); *H02J 7/0014* (2013.01); *H02J 7/0016* (2013.01); *H02J 7/0019* (2013.01); *H02J 7/0022* (2013.01); *H02J 7/0024* (2013.01); *H02J 7/02* (2013.01)

(58) Field of Classification Search
CPC ..... H02J 7/0022; H02J 7/0024; H02J 7/0013; H02J 7/0014; H02J 7/0016; H02J 7/0019; H02J 7/0055
USPC ........................... 320/107–116, 119, 121, 138
See application file for complete search history.

(56) References Cited

U.S. PATENT DOCUMENTS

| | | | | |
|---|---|---|---|---|
| 7,772,802 B2* | 8/2010 | Manico et al. | ................ | 320/108 |
| 8,522,795 B2* | 9/2013 | Bouix et al. | ................... | 132/301 |
| 8,558,411 B2* | 10/2013 | Baarman et al. | ............. | 307/104 |
| 8,729,852 B2* | 5/2014 | Tsai et al. | ...................... | 320/108 |
| 8,957,632 B2* | 2/2015 | Gu | .................................. | 320/108 |
| 2009/0243540 A1* | 10/2009 | Choi et al. | .................... | 320/107 |
| 2010/0156343 A1* | 6/2010 | Jung | ............................. | 320/108 |
| 2010/0289450 A1* | 11/2010 | Kook | ............................ | 320/108 |
| 2011/0074342 A1* | 3/2011 | MacLaughlin | ............... | 320/108 |
| 2011/0074360 A1* | 3/2011 | Kerr et al. | ..................... | 320/137 |
| 2011/0156636 A1* | 6/2011 | Kim | ............................... | 320/108 |
| 2011/0298419 A1* | 12/2011 | Tsai et al. | ..................... | 320/108 |
| 2012/0161697 A1* | 6/2012 | Park et al. | .................... | 320/108 |
| 2012/0229084 A1* | 9/2012 | Gu | ................................. | 320/108 |
| 2013/0026984 A1* | 1/2013 | Yamamoto et al. | ........... | 320/108 |

(Continued)

FOREIGN PATENT DOCUMENTS

JP 2007-336710 A 12/2007
WO 02/086811 A1 10/2002

*Primary Examiner* — Stacy Whitmore
(74) *Attorney, Agent, or Firm* — Maschoff Brennan

(57) ABSTRACT

An electronic apparatus includes first and second power receiving portions that receive first and second powers respectively supplied through two power paths, first and second battery cells that are charged with the first or second power, a first charging path that couples the first power receiving portion to the first battery cell, a second charging path that couples the second power receiving portion to the second battery cell, a third charging path that couples the first charging path to second charging path, and a processor configured to control on-and-off switching of the third charging path in accordance with receiving states of the first and second powers.

6 Claims, 5 Drawing Sheets

(56) References Cited

U.S. PATENT DOCUMENTS

2013/0076301 A1* 3/2013 Bastami .................. 320/107
2013/0093388 A1* 4/2013 Partovi .................. 320/108
2013/0099735 A1* 4/2013 Partovi .................. 320/108
2013/0113421 A1* 5/2013 Han et al. .............. 320/108
2013/0154554 A1* 6/2013 Sakai et al. ............ 320/108
2013/0285604 A1* 10/2013 Partovi ................. 320/108
2014/0042984 A1* 2/2014 Yamada ................. 320/138

* cited by examiner

FIG. 4

|  | T TERMINAL | STATE REPORTING TERMINAL | FETSW190 | FETSW191 |
|---|---|---|---|---|
| 1. CONTACT-CHARGING-ONLY MODE | 0.2 V OR HIGHER | OFF | ON | OFF |
| 2. CONTACTLESS-CHARGING-ONLY MODE | LOWER THAN 0.2 V | ON | ON | ON |
| 3. DOUBLE-CHARGING MODE | 0.2 V OR HIGHER | ON | OFF | ON |
| 4. NON-CHARGING MODE | LOWER THAN 0.2 V | OFF | ON | OFF |

# CHARGING CONTROL OF A BATTERY PACK OF AN ELECTRONIC APPARATUS

CROSS-REFERENCE TO RELATED APPLICATIONS

This application is based upon and claims the benefit of priority of the prior Japanese Patent Application No. 2012-176515, filed on Aug. 8, 2012, the entire contents of which are incorporated herein by reference.

FIELD

The embodiment discussed herein is related to an electronic apparatus, a charging control method, and a charging control program.

BACKGROUND

Electronic apparatuses, such as mobile phones and smart phones, have built-in battery cells therein, and for example, alternating current (AC) adapters are connected to the electronic apparatuses to charge the battery cells with AC power supplies. In recent years, as opposed to "contact" charging performed by connecting an AC adapter to an electronic apparatus, "contactless" charging for performing charging using an electromagnetic induction technology, for example, by placing an electronic apparatus on a battery charging stand.

With enhancement in the functionality of electronic apparatuses in recent years, the capacities of battery cells therein are on a growing trend and thus the amounts of time taken for charging the battery cells also tend to increase. In order to reduce the charging time, it is conceivable to increase charging current flowing from a power supply to a battery cell. However, since the current capacities of the battery cell and a charging circuit are limited, it is difficult to significantly increase the charging current.

In that respect, in related art, a technology in which a capacitor and a rechargeable battery are provided side by side and are charged during both contact charging and contactless charging is available to increase the charging speed. Such a technology is disclosed in, for example, International Publication Pamphlet No. 2002/086811.

SUMMARY

According to an aspect of the invention, an electronic apparatus includes first and second power receiving portions that receive first and second powers respectively supplied through two power paths, first and second battery cells that are charged with the first or second power, a first charging path that couples the first power receiving portion to the first battery cell, a second charging path that couples the second power receiving portion to the second battery cell, a third charging path that couples the first charging path to second charging path, and a processor configured to control on-and-off switching of the third charging path in accordance with receiving states of the first and second powers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates one example of a control table used for charging control.

DESCRIPTION OF EMBODIMENTS

In the related art, no consideration has been given to efficiently performing charging in accordance with a receiving state of powers supplied from multiple power paths.

That is, in the related art, the capacitor and the rechargeable battery are provided side by side, and a charging path for the contact charging and a charging path for the contactless charging are coupled to the capacitor and the rechargeable battery. Thus, in the related art, for example, no consideration has been given to simultaneously performing contact charging and contactless charging in parallel.

In an electronic apparatus according to one embodiment disclosed herein, charging can be efficiently performed in accordance with the receiving states of powers supplied from multiple power paths.

The electronic apparatus according to the embodiment disclosed herein will be described below in detail with reference to the accompanying drawings. It is, however, to be noted that the disclosed technology is not limited to this embodiment. Although a mobile phone (a smart phone) will be described as one example of the electronic apparatus in the embodiment below, the disclosed technology is not limited thereto.

Figure 1:
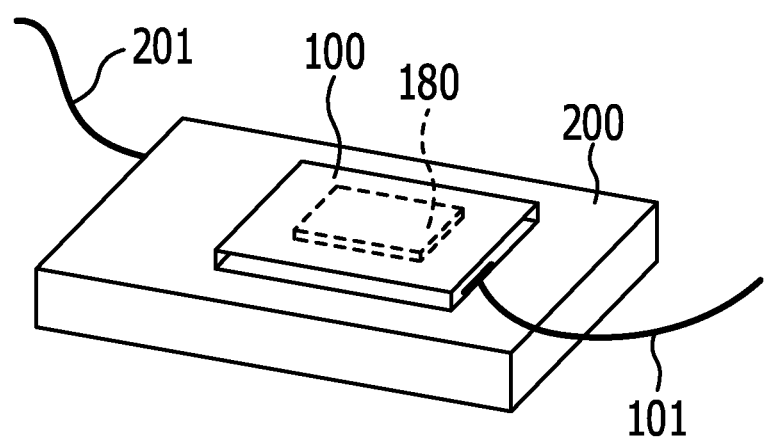
FIG. 1 is a schematic view illustrating an overview of a double charging method for a mobile phone according to an embodiment.

FIG. 1 is a schematic view illustrating an overview of a double charging method for a mobile phone according to the present embodiment. As illustrated in FIG. 1, a mobile phone 100 according to the present embodiment supports both contact charging through an AC adapter cable 101 and contactless charging through a battery charging stand 200 and a power-supply cable 201.

More specifically, the mobile phone 100 has a built-in battery pack 180 therein. The mobile phone 100 is configured so that the AC adapter cable 101 is connectable thereto to charge the battery pack 180 with power received through the AC adapter cable 101. Details of the battery pack 180 are described later. In the following description, power received by contact charging through the AC adapter cable 101 is referred to as "first power", as appropriate.

As illustrated in FIG. 1, the mobile phone 100 is placed on the battery charging stand 200, so that the battery pack 180 is charged through the battery charging stand 200 by contactless charging utilizing electromagnetic induction. The power-supply cable 201 is connected to the battery charging stand 200. The battery charging stand 200 has therein a built-in coil for performing electromagnetic induction. The battery pack 180 in the mobile phone 100 also has therein a built-in coil for performing electromagnetic induction. The battery charging stand 200 receives power through the power-supply cable 201. The mobile phone 100 receives power electromagnetically induced by the coil built into the battery charging stand 200 and the coil built into the battery pack 180 in the mobile phone 100, to charge the battery pack 180 with the received power. In the following description, the power received by contactless charging through the coil built in the battery pack 180 is referred to as "second power", as appropriate.

Figure 2:
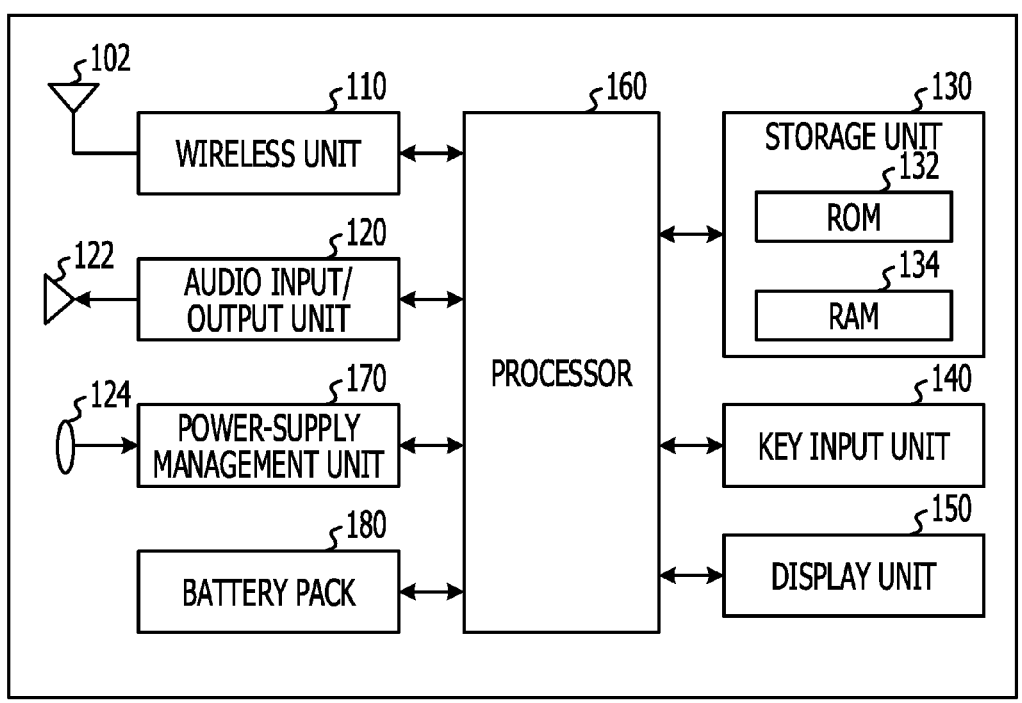
FIG. 2 is a diagram illustrating the hardware configuration of the mobile phone according to the embodiment.

The configuration of the mobile phone 100 will be described next. FIG. 2 is a diagram illustrating the hardware configuration of the mobile phone according to the present embodiment. As illustrated in FIG. 2, the mobile phone 100 according to the present embodiment includes an antenna 102, a wireless unit 110, an audio input/output unit 120, a speaker 122, and a microphone 124, in addition to the battery pack 180. The mobile phone 100 further includes a storage unit 130, a key input unit 140, a display unit 150, a processor 160, and a power-supply management unit 170.

The wireless unit 110 performs wireless communication of voice and various types of data, such as characters, via the antenna 102. The audio input/output unit 120 serves as an input/output interface that inputs sound via the microphone 124 and that outputs sound via the speaker 122.

The storage unit 130 has a read only memory (ROM) 132 that stores therein data for executing various functions of the mobile phone 100 and various programs for executing the various functions of the mobile phone 100. The storage unit 130 further has a random access memory (RAM) 134 that stores therein any of the various programs stored in the ROM 132.

The key input unit 140 serves as an input interface that receives an operation input performed by a user via various operation keys provided on the mobile phone 100. The display unit 150 serves as a touch-panel-type input/output interface that displays various types of information, such as characters and images, and that receives an operation input performed by the user.

The processor 160 serves as a computational processing unit, such as a central processing unit (CPU), for executing the various programs stored in the ROM 132 or the RAM 134. By executing the various programs stored in the ROM 132 or the RAM 134, the processor 160 controls the wireless unit 110, the audio input/output unit 120, the key input unit 140, the display unit 150, the power-supply management unit 170, the battery pack 180, and so on which are described above. The programs executed by the processor 160 are not only stored in the ROM 132 or the RAM 134, but may also be recorded on a distributable storage medium, such as a compact disc-read only memory (CD-ROM) or a memory medium. In such a case, the processor 160 may read the programs from the storage medium and execute the programs. The programs may also be stored on a server, connected over a network, so as to be operable on the server, so that, upon reception of a request from the mobile phone 100 connected over the network, services can be supplied to the mobile phone 100.

Figure 3:
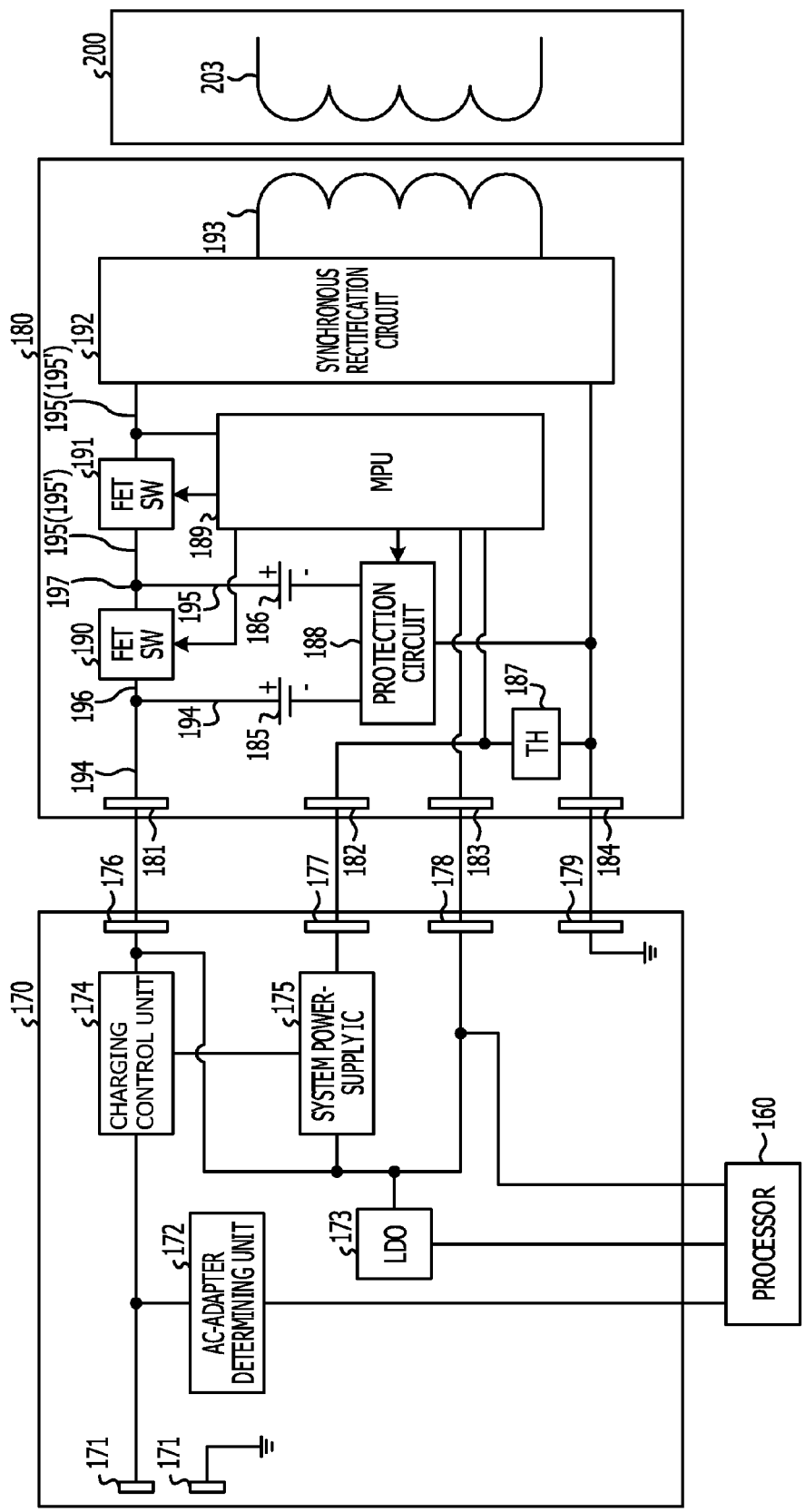
FIG. 3 is a diagram illustrating the configuration of a power-supply management unit and a battery pack.

Next, a description will be given of the configuration of the power-supply management unit 170 and the battery pack 180. FIG. 3 is a diagram illustrating the configuration of the power-supply management unit and the battery pack.

As illustrated in FIG. 3, the power-supply management unit 170 includes a power receiving portion 171, an AC-adapter determining unit 172, a low drop output (LDO) voltage regulator 173, a charging control unit 174, and a system power-supply integrated circuit (IC) 175. The power-supply management unit 170 further includes a power-supply terminal 176, a T terminal 177, a state-reporting terminal 178, and a grounding terminal 179.

The power receiving portion 171 is coupled to the AC adapter cable 101 to receive the first power supplied through the AC adapter cable 101. The AC-adapter determining unit 172 determines whether or not the power receiving portion 171 is receiving the first power through the AC adapter cable 101. A result of the determination as to whether or not the power receiving portion 171 is receiving the first power is reported to the processor 160.

For example, when the AC-adapter determining unit 172 determines that the power receiving portion 171 is not receiving the first power, the LDO voltage regulator 173 outputs a low-level signal. For example, when the AC-adapter determining unit 172 determines that the power receiving portion 171 is not receiving the first power, the processor 160 outputs an instruction signal to the LDO voltage regulator 173 and the LDO voltage regulator 173 receives the instruction signal and then outputs a low-level signal.

The charging control unit 174 controls the amount of power with which the battery pack 180 is charged. For example, when the amount of power with which the battery pack 180 is charged is small, the charging control unit 174 increases the amount of power from the power receiving portion 171, and when the amount of power with which the battery pack 180 is charged is large, the charging control unit 174 reduces the amount of power from the power receiving portion 171.

When the LDO voltage regulator 173 outputs the low-level signal, the system power-supply IC 175 outputs a voltage that is lower than 0.2 V to the T terminal 177. The power-supply terminal 176 is a terminal for outputting the first power, received by the power receiving portion 171, to the battery pack 180. The T terminal 177 is a terminal for outputting, to the battery pack 180, a signal indicating whether or not the power receiving portion 171 is receiving the first power.

The state-reporting terminal 178 is a terminal for outputting, from the battery pack 180 to the processor 160, a signal indicating whether or not contactless charging from the battery charging stand 200 to the battery pack 180 is performed. The grounding terminal 179 is a terminal for equalizing a ground level (0 V) of the power-supply management unit 170 and a ground level of the battery pack 180.

The battery pack 180, on the other hand, includes a power-supply terminal 181, a T terminal 182, a state-reporting terminal 183, and a grounding terminal 184. The battery pack 180 further includes a first battery cell 185, a second battery cell 186, a thermal switch (TH) 187, a protection circuit 188, and a micro processing unit (MPU) 189. The battery pack 180 further includes field effect transistor switches (FETSWs) 190 and 191, a synchronous rectification circuit 192, and a coil 193.

The power-supply terminal 181 is a terminal for receiving the first power received by the power receiving portion 171 and output from the power-supply management unit 170. The T terminal 182 is a terminal for receiving, from the power-supply management unit 170, the signal indicating whether or not the power receiving portion 171 is receiving the first power. The state-reporting terminal 183 is a terminal for outputting, to the power-supply management unit 170, the aforementioned signal indicating whether or not contactless charging from the battery charging stand 200 to the battery pack 180 is performed. The grounding terminal 184 is a terminal for equalizing the ground level (0 V) of the power-supply management unit 170 and the ground level of the battery pack 180.

The first battery cell 185 and the second battery cell 186 are charged with the first power received by the power receiving portion 171 through the AC adapter cable 101 and the second power received by the coil 193 through the battery charging stand 200 in a contactless manner. The power receiving portion 171 and the first battery cell 185 are coupled to each other through a first charging path 194. The coil 193 and the second battery cell 186 are coupled to each other through a second charging path 195.

When the temperature of the battery pack 180 exceeds a preset threshold, the thermal switch (TH) 187 reports a temperature abnormality to the MPU 189 by grounding a line coupled to the T terminal 182 (that is, by short-circuiting the line to a ground-level (0 V)) line. When the temperature of the battery pack 180 exceeds the preset threshold, the protection circuit 188 protects the first battery cell 185 and the second battery cell 186 by discoupling the first battery cell 185 and the second battery cell 186 from the ground-level (0 V) line on the basis of an instruction signal from the MPU 189.

The MPU 189 controls on-and-off switching of the FETSWs 190 and 191 in accordance with the receiving state of the first power at the power receiving portion 171 and the receiving state of the second power in the coil 193. Details of the control performed by the MPU 189 are described later.

The FETSW 190 is provided on a third charging path 196, which couples the first charging path 194 and the second charging path 195, to switch on/off (short-circuit/open) the third charging path 196. The FETSW 191 is provided on a charging path 195' included in the second charging path 195 and located between the coil 193 and a node 197 of the second charging path 195 and the third charging path 196.

The battery charging stand 200 has a built-in coil 203 therein and the battery pack 180 has the built-in coil 193 therein. The coils 203 and 193 cause electromagnetic induction to perform contactless charging from the battery charging stand 200 to the battery pack 180.

The synchronous rectification circuit 192 rectifies the second power, received by the coil 193, into direct-current (DC) power and outputs the DC power to the second charging path 195. A DC voltage output from the synchronous rectification circuit 192 is input to the MPU 189, so that the MPU 189 can determine whether or not a DC voltage is output from the synchronous rectification circuit 192.

Figure 5:
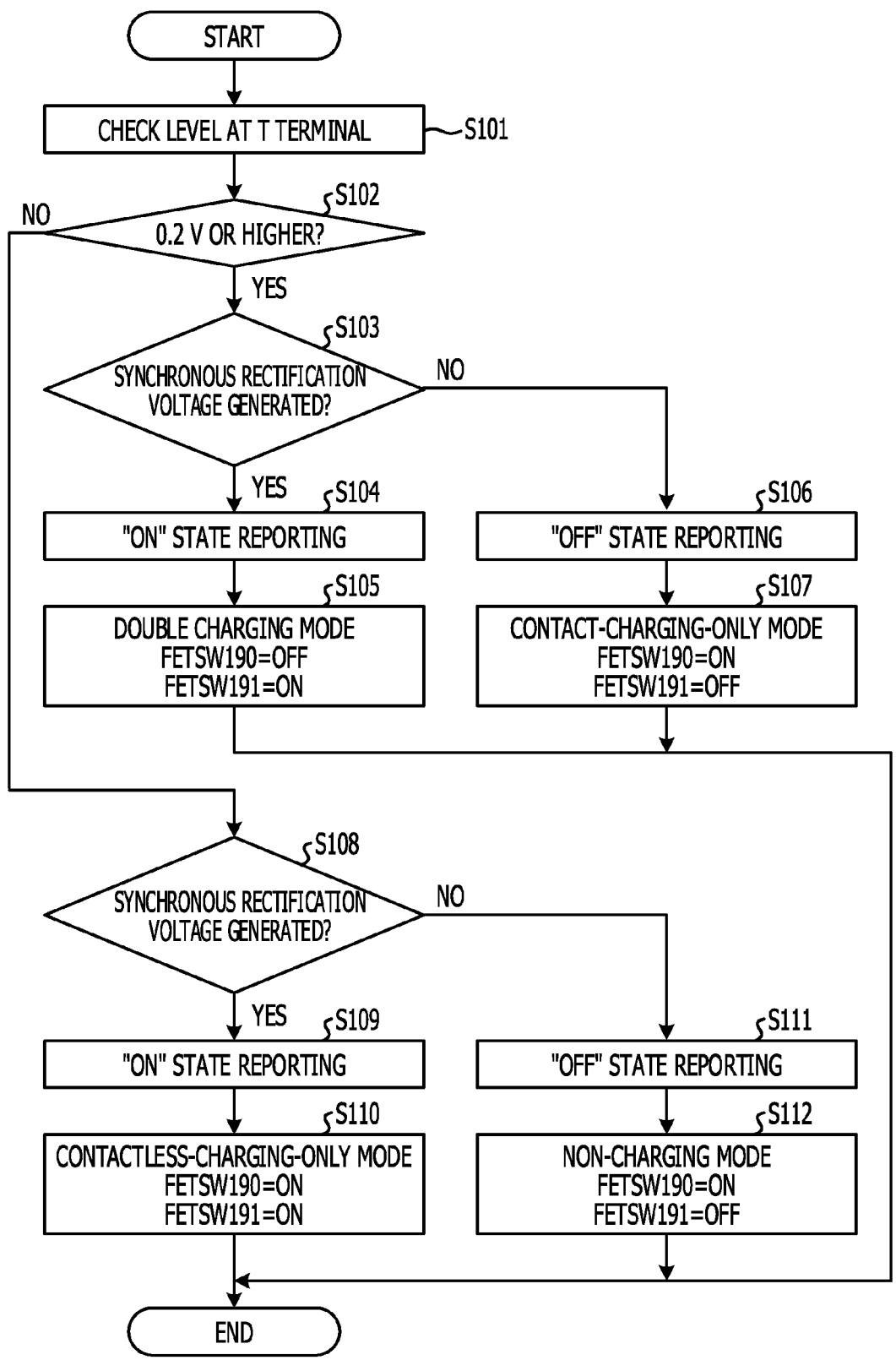
FIG. 5 is a flowchart of charging control for the mobile phone.

Next, a description will be given of details of the control performed by the MPU 189. FIG. 4 illustrates one example of a control table used for charging control. FIG. 5 is a flowchart of the charging control for the mobile phone.

First, as illustrated in FIG. 4, the charging control performed by the MPU 189 has four charging modes. The four charging modes are: (1) "contact-charging-only mode" in which charging is performed with only the first power received through the AC adapter cable 101; (2) "contactless-charging-only mode" in which charging is performed with only the second power received via the coil 193; (3) "double-charging mode" in which charging with the first power and charging with the second power are performed in parallel; and (4) "non-charging mode" in which neither of the first power nor the second power is received.

In (1) "contact-charging-only mode", the levels at the T terminals 177 and 182 are 0.2 V or higher and the state-reporting terminals 178 and 183 are turned off. In this case, the MPU 189 performs control to turn on the FETSW 190 and performs control to turn off the FETSW 191.

In (2) "contactless-charging-only mode", the levels at the T terminal 177 and 182 have values smaller than 0.2 V and the state-reporting terminals 178 are 183 are turned on. In this case, the MPU 189 performs control to turn on the FETSW 190 and performs control to turn on the FETSW 191.

In (3) "double-charging mode", the levels at the T terminals 177 and 182 are 0.2 V or higher and the state-reporting terminals 178 and 183 are turned on. In this case, the MPU 189 performs control to turn off the FETSW 190 and performs control to turn on the FETSW 191.

In (4) "non-charging mode", the levels at the T terminals 177 and 182 have values smaller than 0.2 V and the state-reporting terminals 178 and 183 are turned off. In this case, the MPU 189 performs control to turn on the FETSW 190 and performs control to turn off the FETSW 191.

Next, the charging control performed by the MPU 189 will be described with reference to a flowchart illustrated in FIG. 5. As illustrated in FIG. 5, the MPU 189 first checks the level at the T terminal 182 in step S101. Subsequently, in step S102, the MPU 189 determines whether or not the level at the T terminal 182 is 0.2 V or higher.

When the MPU 189 determines that the level at the T terminal 182 is 0.2 V or higher (Yes in step S102), the process proceeds to step S103 in which the MPU 189 determines whether or not a synchronous rectification voltage is generated. Upon determining that a synchronous rectification voltage is generated (Yes in step S103), the MPU 189 outputs a signal for "ON" to the state-reporting terminal 183 in step S104.

Since the level at the T terminal 182 is 0.2 V or higher and the state-reporting terminal 183 is on, the process proceeds to step S105 in which the MPU 189 determines that the mode is the double-charging mode, preforms control to turn off the FETSW 190, and performs control to turn on the FETSW 191.

On the other hand, upon determining that no synchronous rectification voltage is generated (No in step S103), the MPU 189 outputs a signal for "OFF" to the state-reporting terminal 183 in step S106.

Since the level at the T terminal 182 is 0.2 V or higher and the state-reporting terminal 183 is off, the process proceeds to step S107 in which the MPU 189 determines that the mode is the contact-charging-only mode, performs control to turn on the FETSW 190, and performs control to turn off the FETSW 191.

On the other hand, upon determining that the level at the T terminal 182 is not 0.2 V or higher, that is, is lower than 0.2 V (No in step S102), the process proceeds to step S108 in which the MPU 189 determines whether or not a synchronous rectification voltage is generated. Upon determining that a synchronous rectification voltage is generated (Yes in step S108), the MPU 189 outputs a signal for "ON" to the state-reporting terminal 183 in step S109.

Since the level at the T terminal 182 is not 0.2 V or higher and the state-reporting terminal 183 is on, the process proceeds to step S110 in which the MPU 189 determines that the mode is the contactless-charging-only mode, performs control to turn on the FETSW 190, and performs control to turn on the FETSW 191.

On the other hand, upon determining that no synchronous rectification voltage is generated (No in step S108), the MPU 189 outputs a signal for "OFF" to the state-reporting terminal 183 in step S111.

Since the level at the T terminal 182 is not 0.2 V or higher and the state-reporting terminal 183 is off, the process proceeds to step S112 in which the MPU 189 determines that the mode is the non-charging mode, performs control to turn on the FETSW 190, and performs control to turn off the FETSW 191.

Since the mobile phone 100 according to the present embodiment controls on-and-off switching of the charging paths in accordance with the receiving states of the first power and the second power, charging can be performed efficiently.

That is, in the "double-charging mode", since the FETSW 190 is controlled to be turned off and the FETSW 191 is controlled to be turned on, the first battery cell 185 is charged with the first power and the second battery cell 186 is charged with the second power. As a result, charging of two powers supplied from two power paths (for an AC adapter and the battery charging stand 200) can be simultaneously performed in parallel, so that rapid charging can be performed.

In the "contact-charging-only mode", since the FETSW 190 is controlled to be turned on and the FETSW 191 is controlled to be turned off, the first battery cell 185 and the second battery cell 186 are charged with the first power in parallel. That is, since two battery cells can simultaneously be charged with the first power, rapid charging can be performed.

In the "contactless-charging-only mode, since the FETSW 190 is controlled to be turned on and the FETSW 191 is controlled to be turned on, the first battery cell 185 and the second battery cell 186 are charged with the second power in parallel. That is, since two battery cells can simultaneously be charged with the second power, rapid charging can be performed.

In the "non-charging mode", since the FETSW 190 is controlled to be turned on and the FETSW 191 is controlled to be turned off, power received by the first battery cell 185 and the second battery cell 186 can be supplied to the individual units in the mobile phone 100.

Although a case in which the first power is power received through the AC adapter in a contact manner and the second power is power received through the battery charging stand 200 in a contactless manner has been described in the above embodiment by way of example, the present disclosure is not limited thereto. In addition, although an example in which the third charging path 196 has the FETSW 190 and the charging path 195' has the FETSW 191 has been described in the above embodiment, the present disclosure is not limited thereto.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic apparatus comprising:
a first power receiving portion that includes at least one first terminal configured to receive a first power supplied by a first power source;
a second power receiving portion that includes a coil configured to receive a second power supplied by a second power source;
a first battery cell;
a first charging path that couples the first power receiving portion to the first battery cell such that the first charging path is configured to enable reception of the first power at the first battery cell;
a second battery cell;
a second charging path that couples the second power receiving portion to the second battery cell such that the second charging path is configured to enable reception of the second power at the second battery cell;
a third charging path configured to couple the first charging path to the second charging path such that the third charging path is configured to enable reception of the first power at the second battery cell and such that the third charging path is configured to enable reception of the second power at the first battery cell; and
a processor configured to control on-and-off switching of the third charging path in accordance with receiving states of the first and second powers, the first charging path and the second charging path being coupled when the third charging path is switched on and the first charging path and the second charging path not being coupled when the third charging path is switched off.

2. The electronic apparatus according to claim 1, wherein when both of the first and second powers are received, the processor is configured to control so that the third charging path is switched off.

3. The electronic apparatus according to claim 1, wherein, when one of the first and second powers is received, the processor is configured to control so that the third charging path is switched on.

4. The electronic apparatus according to claim 1, further comprising:
a first switching circuit that switches on or off the third charging path; and
a second switching circuit that switches on or off a charging path included in the second charging path and located between the second power receiving portion and a node of the second charging path and the third charging path,
wherein, in a case in which the first power source includes an alternating-current adapter coupled to the first power receiving portion and the second power source includes a contactless power supply that supplies the second power to the second power receiving portion in a contactless manner,
the processor is configured to:
control to turn off the first switching circuit and performs control to turn on the second switching circuit, when both of the first power and the second power are received,
perform control to turn on the first switching circuit and performs control to turn off the second switching circuit, when the first power is received and the second power is not received or when neither of the first power nor the second power is received, and
perform control to turn on the first switching circuit and performs control to turn on the second switching circuit, when the second power is received and the first power is not received.

5. A charging control method comprising:
determining, by a processor, whether or not a first power is received from a first power source, a first charging path being configured to enable reception of the first power by a first battery cell;
determining whether or not a second power is received from a second power source, a second charging path being configured to enable reception of the second power by a second battery cell; and
controlling, in accordance with a result of the determination as to the reception of the first power and the second power, on-and-off switching of a third charging path configured to couple the first charging path and the second charging path such that the third charging path is configured to enable reception of the first power at the second battery cell and such that the third charging path is configured to enable reception of the second power at the first battery cell, the first charging path and the second charging path being coupled when the third charging path is switched on and the first charging path and the second charging path not being coupled when the third charging path is switched off.

6. A non-transitory machine readable medium storing a charging control program causing an electronic apparatus to execute processing comprising:

determining whether or not a first power is received from a first power source, a first charging path being configured to enable reception of the first power by a first battery cell;

determining whether or not a second power is received from a second power source, a second charging path being configured to enable reception of the second power by a second battery cell; and controlling, in accordance with a result of the determination as to the reception of the first power and the second power, on-and-off switching of a third charging path configured to couple the first charging path and the second charging path such that the third charging path is configured to enable reception of the first power at the second battery cell and such that the third charging path is configured to enable reception of the second power at the first battery cell, the first charging path and the second charging path being coupled when the third charging path is switched on and the first charging path and the second charging path not being coupled when the third charging path is switched off.

* * * * *